United States Patent [19]
Adams

[11] Patent Number: 6,081,186
[45] Date of Patent: Jun. 27, 2000

[54] LOW-POWER DOOR ALARM AND LOCK SYSTEM

[76] Inventor: Morgan Allen Adams, 5464 W. Osborn Rd., Phoenix, Ariz. 85031

[21] Appl. No.: 09/226,745

[22] Filed: Jan. 6, 1999

[51] Int. Cl.[7] .................................................. B60R 25/10
[52] U.S. Cl. ..................... 340/426; 340/545.6; 296/37.6; 224/402; 224/404; 70/69; 70/78; 70/158; 70/237; 116/33; 116/86; 200/61.64; 200/61.67; 200/61.81
[58] Field of Search .................................... 340/426, 438, 340/542, 545.1, 545.6; 296/37.6; 224/404, 402, 539, 541–544, 315; 70/69, 78, 158, 237, 57, 57.1, 58, 63, 77, 80, 84, 91, 159–162; 200/61.64, 61.67, 61.62, 61.63, 61.71, 61.7, 61.81

[56] References Cited

U.S. PATENT DOCUMENTS

| | | |
|---|---|---|
| 980,380 | 1/1911 | Wilhite . |
| 3,640,423 | 2/1972 | Parker et al. . |
| 3,745,796 | 7/1973 | Fleming ........................................ 70/81 |
| 3,797,006 | 3/1974 | Reininger ................................. 340/545 |
| 4,284,980 | 8/1981 | Hoinski ................................... 340/545 |
| 4,580,827 | 4/1986 | Feagen . |
| 4,635,454 | 1/1987 | Brown ........................................ 70/139 |
| 4,683,974 | 8/1987 | Richardson . |
| 4,936,624 | 6/1990 | West . |
| 4,998,425 | 3/1991 | Hoogland . |
| 5,083,829 | 1/1992 | Fonseca . |
| 5,172,097 | 12/1992 | Arnold . |
| 5,235,830 | 8/1993 | Benge . |
| 5,299,722 | 4/1994 | Cheney . |
| 5,655,394 | 8/1997 | DiRocco, Jr. . |
| 5,727,835 | 3/1998 | Krush et al. . |

*Primary Examiner*—Nina Tong
*Attorney, Agent, or Firm*—Fennemore Craig, P.C.; Sandra L. Etherton

[57] ABSTRACT

An electronic system of locking and alarming one or more doors such that if an attempt is made to open the door, the alarm sounds. The device is preferably installed on vehicles having multiple built-in equipment compartments. The device is powered by the vehicle battery and includes a novel lock mechanism which requires very little power. The lock mechanism comprises a lock housing, a pin, a pivoting latch gate, a switch and a solenoid. The device is electrically connected to a vehicle's conventional remote-controlled security system and sounds an alarm if an attempt is made to open a compartment door.

5 Claims, 3 Drawing Sheets

LOW-POWER DOOR ALARM AND LOCK SYSTEM

This invention relates generally to electronically-controlled locks. More particularly this invention relates to a low-power lock and security system installed on vehicle equipment compartments.

BACKGROUND

Service trucks, pick-up trucks, other work vehicles and recreational vehicles have multiple built-in compartments which are used to carry tools and other expensive equipment. Each of the several compartments usually has its own lock to secure the items within. The prior art is replete with locking mechanisms for individual vehicle toolboxes. A disadvantage of these individual locking mechanisms is that when the driver of the vehicle or service technician leaves the vicinity of the vehicle, for example to perform technical services, the equipment left in any open compartment is vulnerable to theft. In fact, it is a common industry problem that service truck vehicles are frequently burgled to steal valuable equipment carried in toolboxes built into the service truck. Consequently, care must be taken to lock each toolbox individually each time the toolbox is entered. When multiple toolboxes need to be entered, each toolbox must be locked and unlocked separately, which is inconvenient and annoying. It is desirable to have a lock system that enables all vehicle equipment compartments to be locked and unlocked simultaneously.

Thieves can defeat locks by breaking the lock mechanism, so alarms are often used in conjunction with locks to further secure the items within. U.S. Pat. No. 5,727,835 issued to Krush describes an alarmed tool box installed in the bed of a pick-up truck that sounds the vehicle's horn and flashes the vehicle's lights if the lid is opened. The security system is powered by the vehicle battery. One disadvantage of this type of alarmed lock is that the alarm sounds only after the lock has been defeated. Since the lock mechanism must have been breached for the lid to open and the alarm to sound, by the time the driver responds to the alarm, the thief may have escaped with the equipment in the toolbox. Thus, it is desirable to alarm vehicle toolboxes and other equipment compartments to ward-off intruders and provide notice of an attempted break-in.

Conventional electronic lock systems are at rest in a locked state; to unlock a door, the system must be energized. Consequently, another disadvantage of known security systems which use electronic lock mechanisms that are powered by the vehicle battery is that, if the lock is left in unlock mode, the system draws so much power to stay unlocked that the battery runs down quickly. It is therefore desirable to lock vehicle equipment compartments with a system that is low-power, so that the vehicle battery is not drained. Vehicle alarms are known in the art which lock and alarm vehicle doors, however no such system has been developed for locking and alarming multiple equipment compartments using little power.

Therefore, it is an object of this invention to provide a system which locks and alarms multiple vehicle tool compartments and allows locking and unlocking of all the compartment doors simultaneously. It is a further object of this invention to provide a system that utilizes a vehicle security system and battery to alarm the compartment doors and warn of an attempted break-in. Another object of this invention is to provide a tool box lock and security system which requires little power for operation. The foregoing objects are achieved by this invention as described in detail below and shown in the accompanying drawings.

SUMMARY OF THE INVENTION

The invention is an electronic system of locking and alarming one or more doors such that if an attempt is made to open the door, the alarm sounds. The device is preferably installed on vehicles having built-in equipment compartments. The device is powered by the vehicle battery and includes a novel lock mechanism which requires very little power. The lock mechanism comprises a lock housing, a pin, a pivoting latch gate, a switch and a solenoid. The device is electrically connected to a vehicle's conventional remote-controlled security system and sounds an alarm if an attempt is made to open a compartment door.

DESCRIPTION OF THE PREFERRED EMBODIMENTS

Figure 1:
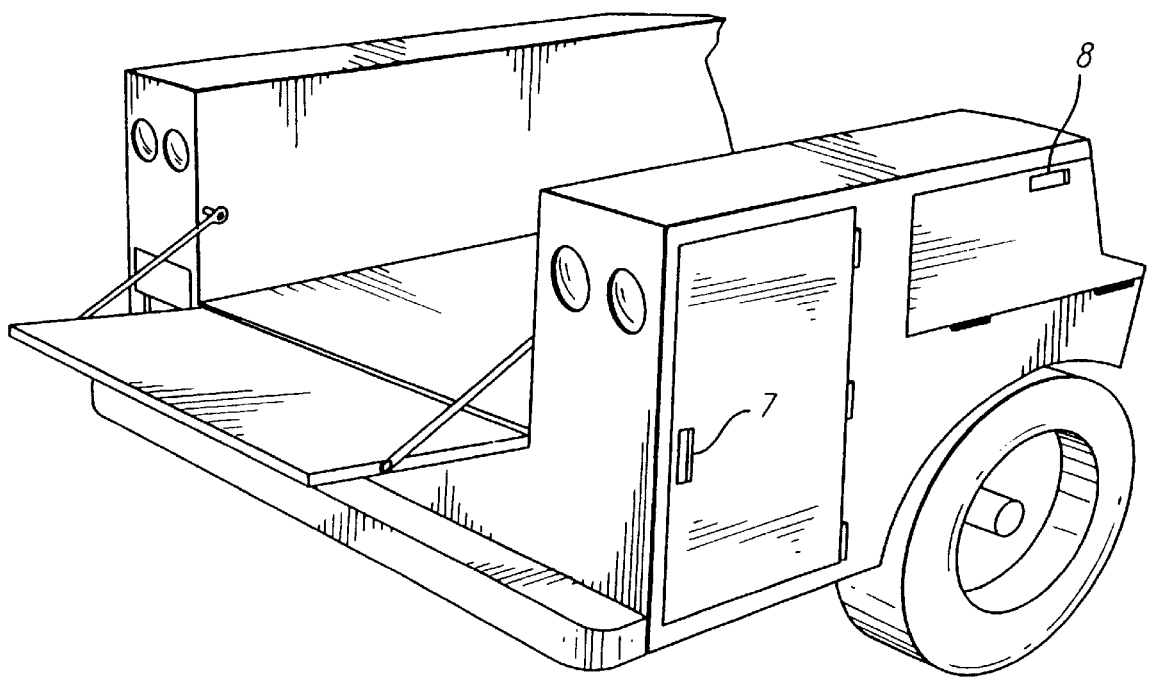
FIG. 1 is a rear perspective view of a service truck showing tool boxes with vertical locks and horizontal locks.

This invention is a security system for vehicles that have equipment compartments. The invention is described in its preferred embodiment, as installed on service trucks having multiple built-in toolboxes, however the system may be installed on any vehicle having one or more equipment compartments, including pick-up trucks, other work vehicles and recreational vehicles. FIG. 1 illustrates a service truck having multiple toolboxes having locks which latch in the horizontal direction 7 and vertical direction 8. The locks are controlled electronically via a remote control device.

Figure 2:
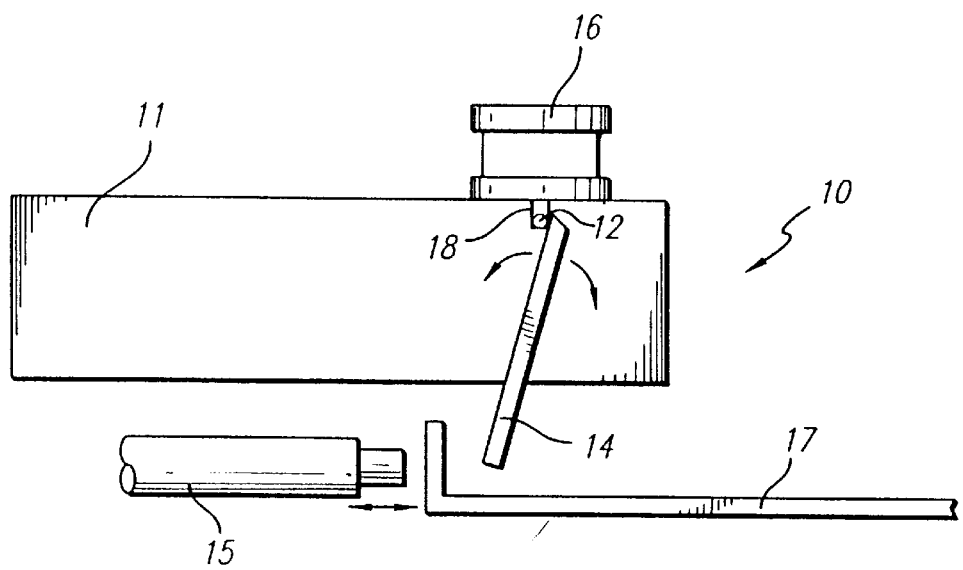
FIG. 2 is a side view of the latch mechanism of the preferred embodiment of the present invention on a horizontal lock.
Figure 3:
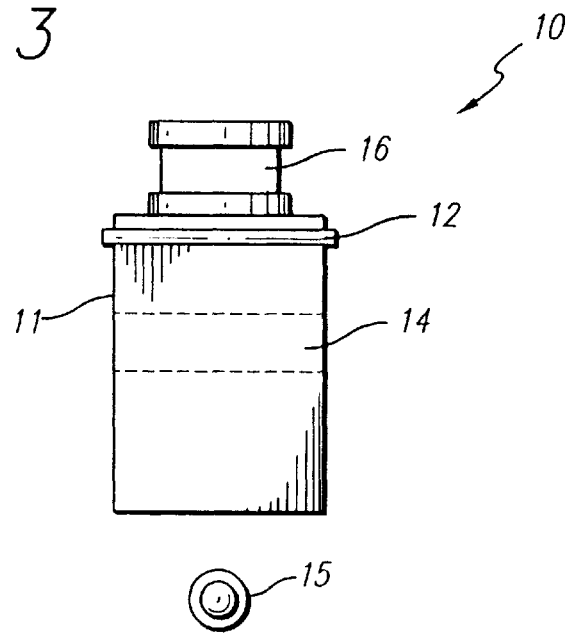
FIG. 3 is a front view of the latch mechanism of the preferred embodiment of the present invention on a horizontal lock.

FIGS. 2 and 3 illustrate the lock mechanism, indicated generally as 10, for a horizontal latch. The mechanism comprises a lock housing 11 having a slot 18, a pin 12, a pivoting latch gate 14, a switch 15, and a solenoid 16. A striker 17 is connected to a toolbox door (not shown) and normally rests against the switch 15, closing the switch. When the toolbox is locked, the pin 12 rests in the slot 18 and blocks the pivoting latch gate 14 from pivoting, thereby preventing the striker 17 from passing by the latch gate 14 and preventing door from opening. The striker 17, switch 15, and latch gate 14 are positioned relative to each other such that the striker 17 may be retracted far enough from the switch 15 to enable the switch 15 to be open while the latch gate 14 is still blocked by the pin 12. When the striker 17 is pulled away from the switch 15, the switch opens and an alarm sounds. This arrangement functions as a tamper-detection mechanism and causes the device to sound an alarm when the door is pulled ajar a small distance, even when locked. The door cannot open, however, because the latch gate 14 is prevented from pivoting and blocks the striker 17 from further movement.

The latch gate 14 has a first end which contacts the pin 12 and a second end which contacts the striker 17. To allow the door to be closed, the first end of the latch gate 14 is beveled at the end as shown in FIG. 2. When the door is opened, the latch gate 14 pivots such that the first end of the latch gate is on the other side of the pin 12. When the door is being closed, the striker 17 contacts the second end of the latch gate 14, causing the latch gate to pivot. The beveled edge of the latch gate 14 forces the pin up into the slot 18, until the striker 17 can pass by the latch gate. The latch gate 14 then pivots back into place, with the first end blocked by the pin 12.

In the preferred embodiment, the device is connected to a remote-controlled vehicle security system which controls the lock and alarm of the passenger doors. The security system is preferably operated by remote control. These security systems are available commercially and may be installed during the vehicle manufacture or as an aftermarket accessory. The security system may involve an audible alarm, such as a siren or the vehicle horn, or flashing vehicle lights. The preferred embodiment utilizes a siren.

Conventional security systems have two modes: lock/alarm and unlock/disarm. The mode is chosen by a remote control device, as known in the art. In the present invention, if the doors are in lock/alarm mode, the solenoid 16 is never energized, the solenoid does not lift the pin 12, and the doors stay locked. Retracting the striker 17 from the switch 15 causes the alarm to sound. The security system must be in unlock/disarm mode to allow the doors to open. When in unlock/disarm mode, each time the striker 17 is retracted from the switch 15, the solenoid 16 is energized for a brief period (typically less than 1 second) to lift the pin 12. In unlock/disarm mode, if a passenger door is open, the toolboxes can be entered at will and the alarm will not sound. Similarly, if the vehicle hood or door is open, the alarm will not sound. This prevents the vehicle operator or mechanic, for example, from being locked-out if maintenance is being performed on the vehicle. Additionally in the preferred embodiment, if the vehicle's ignition is on, the system will automatically lock the doors and arm the alarm so that the toolboxes are locked during transit. Similarly, if the system is left in an unlock state for more than a short delay period, the system will automatically lock the doors and arm the alarm so that the toolboxes. Preferably the short delay period is about ten seconds. This prevents an operator from inadvertently leaving the compartments open and unlocked.

To open the toolbox, the system must be in unlock/disarm mode. The striker 17 is pulled away from the lock housing 11, eventually contacting the latch gate 14. When the striker retracts from the switch 15 far enough to open the switch 15, the solenoid 16 is energized. When the solenoid 16 is on, it attracts the pin 12 to the top of the lock housing 11 for a brief period (typically less than 1 second) such that the latch gate 14 can pivot through the plane defined by the slot 18, the striker 17 can pass by the latch gate 14, and the door can be opened. After the brief period, the pin 12 falls by gravity back into the bottom of the slot 18. The alarm is disabled in the unlock/disarm mode so the door can be opened at will with no alarm. Each time the striker 17 is retracted from the switch 15, the solenoid 16 energizes for a brief period and the door can be opened. The device draws essentially no power from the vehicle battery when the solenoid is off.

If the device is in alarm/lock mode, the alarm sounds when the switch plunger is extended, but the door does not unlock because the solenoid 16 is not energized to raise the pin 12. Because the solenoid is off, the pin 12 remains in the bottom of the slot 18, prevents the latch gate 14 from pivoting, and prevents the door from opening.

The pin can be made of any substance which will be attracted towards the solenoid when it is energized, such as steel or other metals having magnetic properties, and must be of sufficient size to withstand the force of the latch gate being pulled vigorously. In the preferred embodiment, the pin is simply a small rod of steel, like a nail. The sheer strength of the pin makes it hardy enough to withstand severe sheer forces of the latch gate, even if an attempt is made to forcefully wrench open the door. Toolbox handles with lift paddles, as opposed to handles having a U- or T-shape, help diminish the likelihood the doors can be forcibly opened.

Figure 4A:
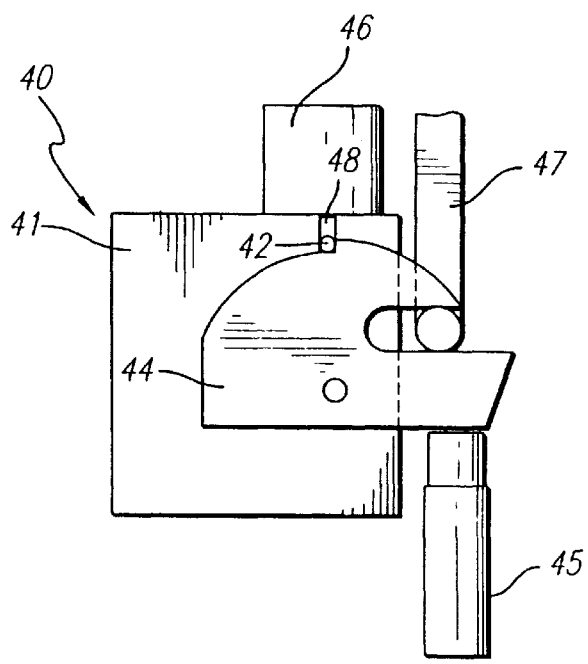
FIG. 4(a) is a side view of the latch mechanism of the preferred embodiment of the present invention on a vertical lock in the locked position.

FIGS. 4(a) and (b) illustrates the lock mechanism, indicated generally as 40, for a vertical latch. The mechanism operates under essentially the same concept as for a horizontal latch, as explained above, but requires that the latch gate 44 and striker 47 cooperate in a different manner to accommodate the need to have the slot lie in a substantially vertical plane so that gravity causes the pin to fall into the bottom of the slot thereby keeping the doors locked. The mechanism comprises a lock housing 41 having a slot 48, a pin 42, a rotating latch gate 44, a switch 45 and a solenoid 46. A striker 47 is connected to a toolbox door (not shown) and normally rests against the switch 45, closing the switch, as shown in FIG. 4(a). When the toolbox is locked, the pin 42 rests in the slot 48 and blocks the pivoting latch gate 44 from rotating, thereby preventing the striker 47 from passing by the latch gate 44 and preventing the door from opening. The striker 47, switch 45, and latch gate 44 are positioned relative to each other such that the striker 47 may be retracted far enough from the switch 45 to enable the switch 45 to be open while the latch gate 44 is blocked by the pin 42. When the striker 47 is pulled away from the switch 45, the switch opens and an alarm sounds.

Figure 4B:
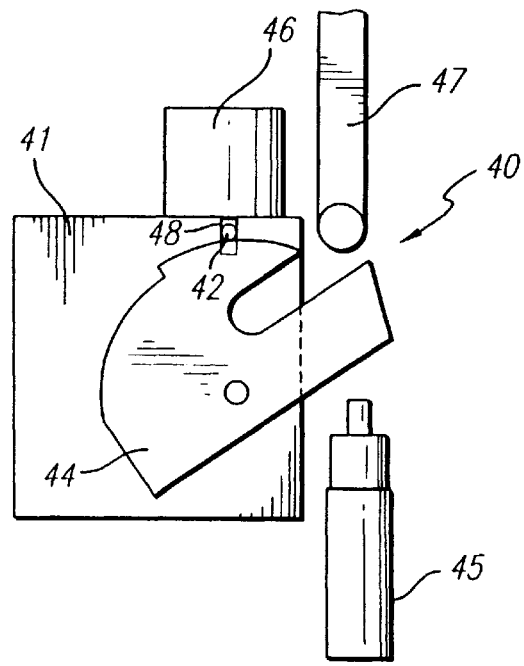
FIG. 4(b) is a side view of the latch mechanism of the preferred embodiment of the present invention on a vertical lock in the unlocked position.

The latch gate 44 is shaped to enable the door to close. As shown in FIG. 4, the latch gate 44 has an arcuate first portion adjoined to a second portion adjoined at a notch. When the door is closed, the notch catches on the pin 42, preventing the latch gate 44 from rotating further. When the door is opened, the latch gate 44 rotates such that the first portion is on the other side of the pin 42. When the door is closed, the striker 17 contacts the latch gate 44, causing it to rotate. The arcuate first portion forces the pin up into the slot 48, until the striker 47 can pass by the latch gate 44. The latch gate 44 then pivots back into place, catching on the pin 42 at the notch.

To open the toolbox, the system must be in unlock/disarm mode. The striker 47 is pulled away from the lock housing 41, closing the switch and activating the solenoid. When the solenoid is on, it attracts the pin to the top of the lock housing 41 for a brief period (typically less than 1 second) such that the latch gate 44 can rotate, the striker 47 can pass by the latch gate 44, and the door can be opened. After the brief period, the pin falls by gravity back into the bottom of the slot.

Figure 5:
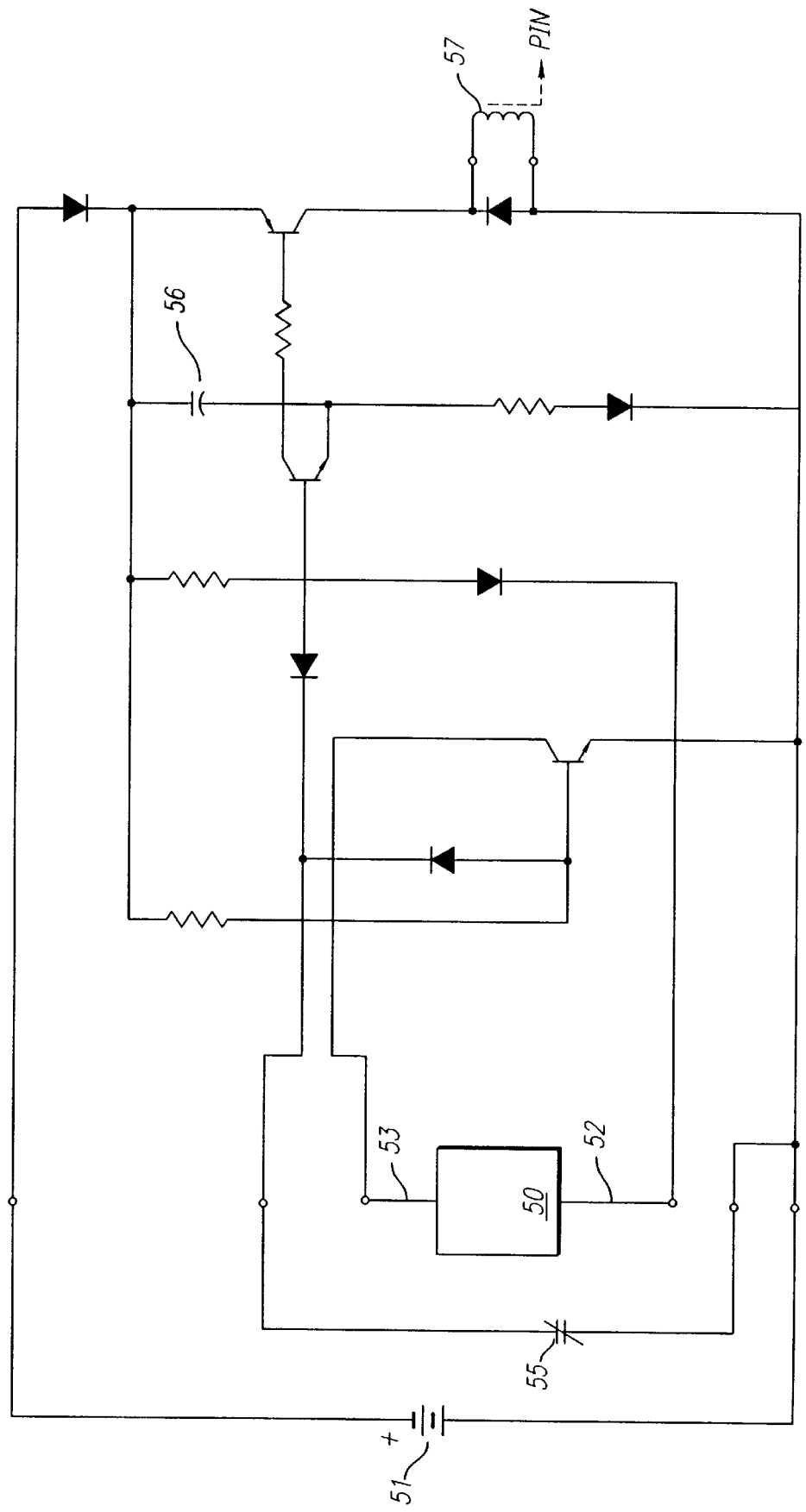
FIG. 5 is a schematic of the preferred embodiment of the present invention.

FIG. 5 illustrates the circuitry of the preferred embodiment of the invention. The security system 50 is connected to the power source 51, preferably a vehicle battery. The security system 50 has at least one output terminal 52 and one input terminal 53, and is normally armed. The security system 50 is changed from lock/alarm mode to unlock/disarm mode by remote control. A switch 55 works in cooperation with a striker (not shown) attached to a compartment door. The switch 55 is normally closed. A capacitor 56 works in cooperation with the solenoid 57 to function as a timing mechanism for lifting the pin, although other timing mechanisms may be used, such as integrated circuit timers.

When the security system 50 is in lock/alarm mode, the capacitor 56 holds its charge and the solenoid 57 is not energized. The pin stays in the bottom of the slot and the door stays locked. If the switch 55 is open, the capacitor will continue holding its charge, but the security system 50 will sound an alarm. The effectively detects an attempt to open the compartment door and thwarts it. When the security system 50 is in unlock/disarm mode, if the switch 55 is open, the capacitor 56 discharges, energizing the solenoid 57 for a brief period, the duration of which is determined by the amount of stored charge in the capacitor 56. While the solenoid 57 is energized, the pin is lifted away from the bottom of the slot and the door can be opened. Once the charge has dissipated from the capacitor 56, the solenoid 57 is no longer energized, and the pin falls to the bottom of the slot thereby locking the door. The capacitor is recharged from the power source 51. The door can be opened at will, and no alarm will sound if the switch 55 is open or closed. The system draws power only when the capacitor is recharged.

Having thus described the invention, it will be apparent to those of skill in the art that various modifications can be made within the scope of the invention.

I claim:

1. A system for locking and alarming compartments comprising:

a) a lock housing having a slot;
   b) a latch gate which moves through a plane defined by the slot;
   c) a pin positionable in the bottom of the slot to prevent the latch gate from moving through the plane defined by the slot;
   d) a solenoid which, when energized, causes the pin to move away from the bottom of the slot to allow the latch gate to move through the plane defined by the slot;
   e) a striker attached to a compartment door which, when the door is pulled ajar, causes the latch gate to move, the striker positioned such that if the pin is in the bottom of the slot the striker is prevented from moving more than a small distance and the compartment door cannot be opened;
   f) a switch positioned relative to the striker such that if the compartment door is pulled open a small distance, the switch is open;
   g) an alarm electrically connected to the switch which is activated if the switch is open.

2. The system according to claim 1 further comprising:

a) a power source;
   b) a timing mechanism electrically connected to the power source and the solenoid such that the solenoid is energized for only a brief period of time.

3. The system according to claim 2 wherein the timing method includes a capacitor which energizes the solenoid when it discharges.

4. The system according to claim 1 wherein the alarm is a vehicle security system.

5. The system according to claim 4 wherein the vehicle security system is remote controlled.

* * * * *